Sept. 26, 1944. H. F. FULLER 2,358,800
ELECTRODE HOLDER
Filed May 4, 1943 2 Sheets-Sheet 1
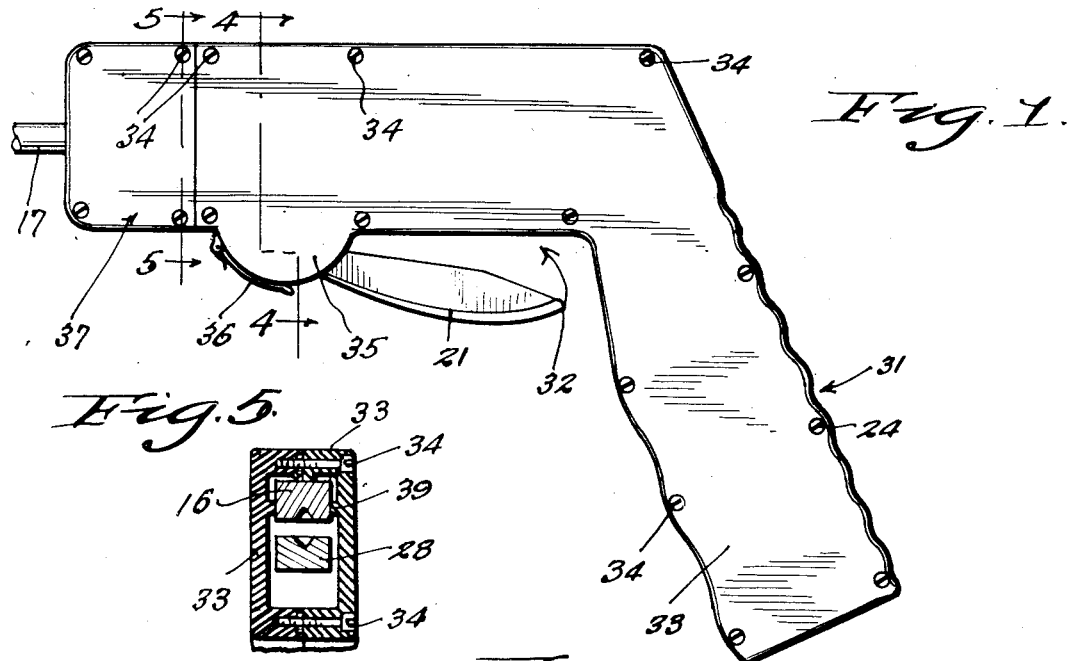
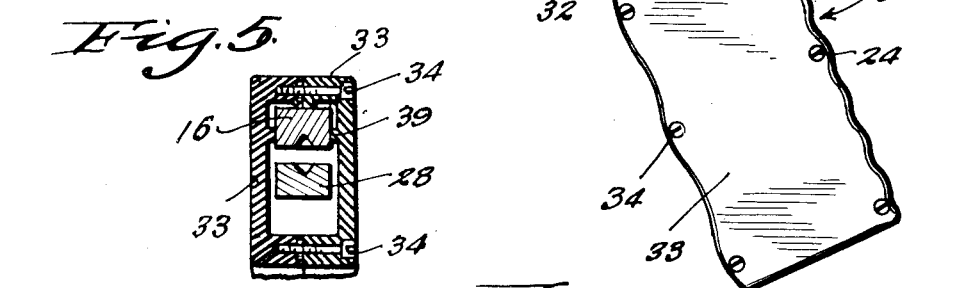
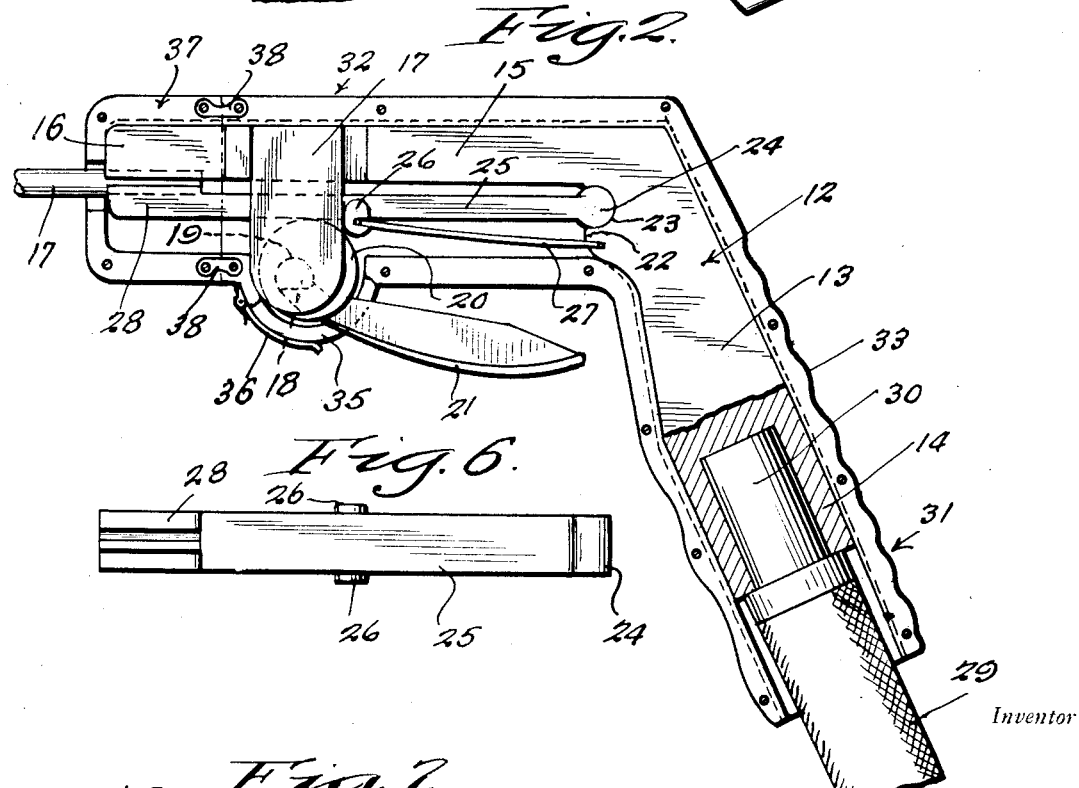
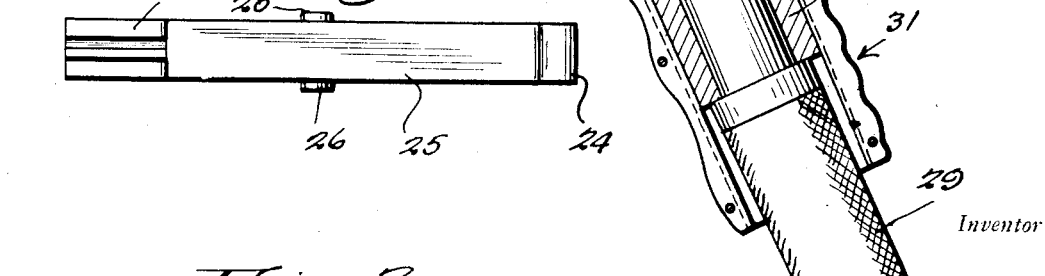
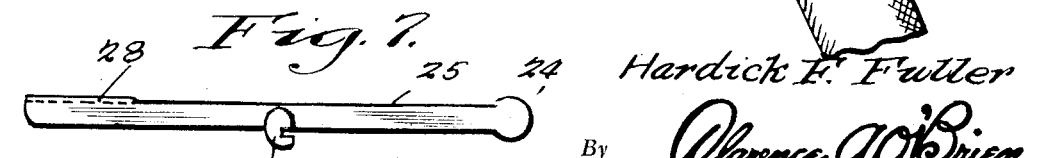
Inventor
Hardick F. Fuller
By Clarence A. O'Brien
and Harvey B. Jacobson
Attorneys Sept. 26, 1944.  H. F. FULLER  2,358,800
ELECTRODE HOLDER
Filed May 4, 1943  2 Sheets-Sheet 2
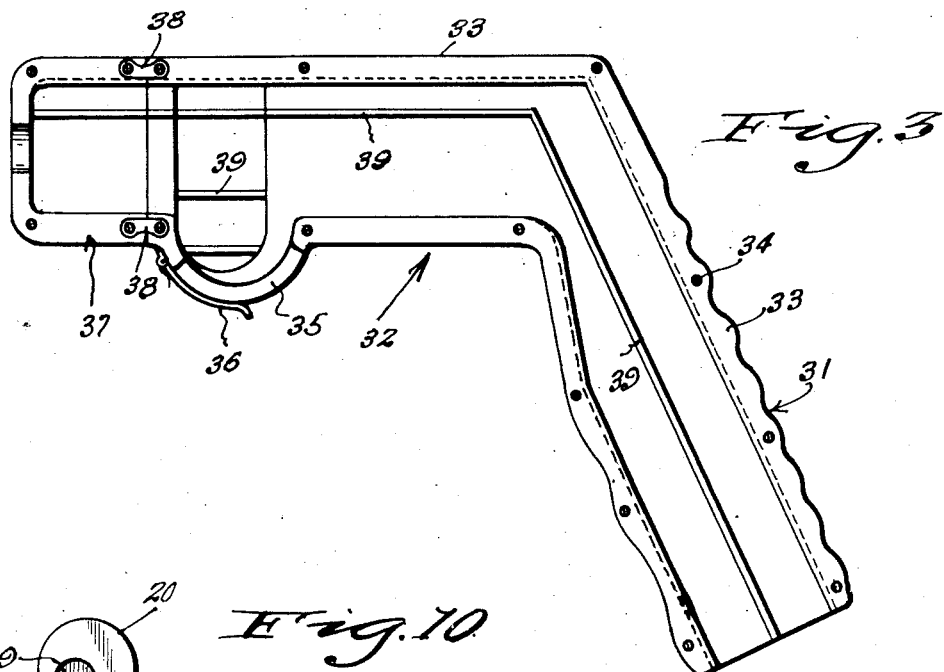
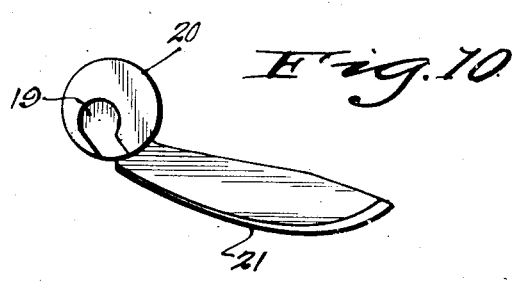
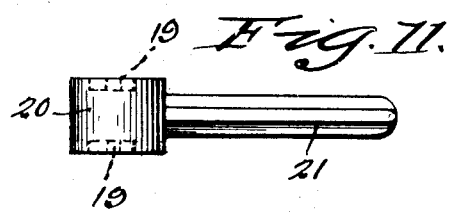
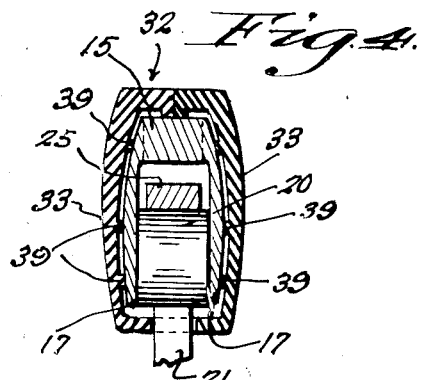
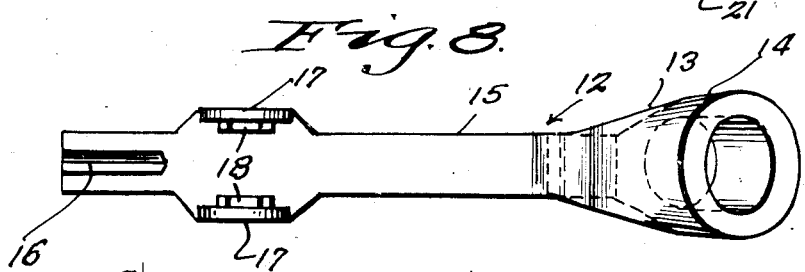
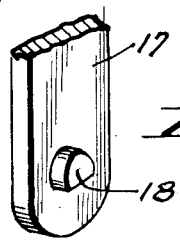
Inventor
Hardick F. Fuller
By Clarence A. O'Brien
and Harvey B. Jacobson
Attorneys Patented Sept. 26, 1944

2,358,800

UNITED STATES PATENT OFFICE 2,358,800

ELECTRODE HOLDER

Hardick F. Fuller, Portland, Oreg.

Application May 4, 1943, Serial No. 485,632

4 Claims. (Cl. 219—8)

This invention relates to a novel and improved holder for so-called welding rods and electrodes, the same having reference to an electro-mechanical contrivance designed to perform the double purpose of securely and adjustably holding the electrodes and also supplying the electric current to said electrodes.

More specifically, in reducing to practice the principles of this invention, I have evolved and produced a holder of the so-called pistol grip type, whereby to permit it to be rapidly and conveniently operated to designed advantage in places often not accessible when using other types of holders.

The holder, constructed in accordance with my idea, is characterized by a structure designed to properly and electrically insulate in a manner to avoid burns and injuries from flashes and arcs.

Another object of the invention is to enhance the particular construction and utility by the adoption and use of a simple and economical arrangement which is effective and reliable, adaptable to the accommodation of electrodes or rods of different diameters and otherwise adaptable to perform desired results with requisite aptitude and ease and expediency in handling the same.

Other features and advantages will become more readily apparent from the following description and the accompanying illustrative drawings.

In the drawings wherein like numerals are employed to designate like parts throughout the sample—

Figure 1 is a side elevational view of the so-called pistol-style electrode or welding rod holder constructed in accordance with the principles of this invention.

Figure 2 is a view like Figure 1 with the insulated enclosing shells removed on one side to expose the construction on the interior.

Figure 3 is a view similar to Figure 2 with the internal parts omitted for clearness of illustration of the enclosing shell structure on one side of the device.

Figures 4 and 5 are cross sections on the planes of the lines 4—4 and 5—5 of Figure 1.

Figure 6 is a top plan view of the relatively movable jaw member.

Figure 7 is an edge view of the jaw member seen in Figure 6.

Figure 8 is a detail view of the companion part including the relatively fixed or stationary jaw, this being the special adapter insert.

Figure 9 is a fragmentary perspective view of one of the parts of the unit in Figure 8.

Figures 10 and 11 are detail views of the lever equipped movable jaw actuating and binding cam.

Attention is first directed to the adapter insert 12. This is a single body of metal and includes a body portion 13 having a cylindrical socketed portion 14 at one end. This is disposed at an approximate obtuse angle to the extension or limb portion 15. This part 15 terminates in a suitably grooved jaw 16 for the electrode 17. Inward of the jaw I provide depending spaced parallel legs 17 having on their inner faces segmental buttons 18 constituting trunnions for reception in depressed hinging assembling bearings 19 provided in the cam 20. Incidentally, the cam is provided with an appropriately shaped suitably insulated operating lever 21. The cam is simply interposed between the legs 17 and the bearings 19 are rockably mounted on the trunnions 18 as is obvious.

At the juncture of the body portion 13 and laterally extending limb 15 I provide, as is shown in Figure 2 a projection 22 which is shaped as at 23 to provide a seat or notch for an assembling and hinging detent 24 on the movable jaw 25. This part 25 extends in spaced parallelism beneath the limb 15 and on its intermediate portion it is provided with keepers 26 for the adjacent end of a flat spring 27. The spring 27 is anchored at its opposite end in the projection 22. The tendency of the spring is to swing the grooved movable jaw head 28 away from the anvil or stationary jaw 16. However, the intermediate portion of this movable jaw member is engaged by the oscillatory cam which can be swung in a direction to bind both jaws 16 and 28 against the rod or electrode 17. The regular or conventional conductor cable 29 is provided with a tip or fitting 30 which projects telescopically into the socket 14 to convey the current through the body 13 and limb and jaws to the electrode.

The assembly of parts described is encased in a pistol-shaped housing including a grip portion 31 and a barrel portion 32. The enclosure is made up of channel-shaped companion shells 33 of appropriate insulation material, said shells being fastened or bolted together as at 34. The shank or barrel portion 32 is provided with segmental pendants 35 to accommodate the cam and lever. The numeral 36 designates a hinged spring forming a closure or cover plate for the companion parts 35. It will be noticed that the portion of the shell embracing the jaws 16 and 28 is in the form of a separable tip 37. The parts making up the tip are linked to the other parts of the shell assembly by the links 38 as shown in Figure 2. For ventilation it will be observed that the channelways which accommodate the parts forming the metallic assembly are provided with spacing ribs 39 at desired points. This serves to prevent overheating as is obvious.

The device shown and described is susceptible of holding almost any size welding rod manufactured by use of the "cam" handle attached. This device will not overheat, will not break the supply of current, and is designed to function properly in any position due to its balanced construction. That is to say, it is balanced like a pistol and used accordingly and is light in weight and has a positive grip on the rod and the lead-in will follow in line and will not kink or break. There are literally millions of welding electrodes or holders in use and they burn out rapidly and have to be discarded. This is painstaking and time-consuming reality. In fact, much time is lost due to overheating during which period the welder must lay the holder aside to cool off.

Novelty is thought to reside in the internal mechanism comprising the limb 15 provided with a jaw 16 cooperating with a movable jaw 28 on the swingable rod member 25 hingedly mounted in the crotch or seat 23 at the juncture of the parts 12 and 15. The part 12 is a substantial member adapted to solidly accommodate the lead-in 29. Novelty is also thought to reside in the parallel legs embracing the intermediate portion of the part 25 and depending below it and serving to oscillate the lever-equipped cam bearing against the intermediate part of the movable jaw unit. The sectional casing composed of insulated parts of pistol-shape configuration and the replaceable and repairable tip 37 add to the cumulative total advantages of the device.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details coming within the field of invention claimed may be resorted to in actual practice, if desired.

Having described the invention, what I claim as new is:

1. An electrode holder of the class described comprising a socketed body portion of electricity conducting material to accommodate the lead-in, a limb on said body portion terminating in a jaw, there being a seating notch at the juncture of the limb and body portion, a bar-like relatively movable jaw member having a detent at one end rockable in said notch and a jaw at the opposite end opposed in parallelism to the first-named jaw, said bar-like jaw member being provided with keepers, a spring engaged at one end in said keepers and at its opposite end to the junctural portion of the body and limb member, a rockably mounted cam carried by the limb and engageable with the intermediate portion of the movable jaw member, and an enclosing structure for said parts, said enclosing structure being of insulated material.

2. As a component part of an assemblage of the class described, a body having a socket to accommodate a lead-in, a limb extending angularly from said body, said limb terminating in a fixed jaw member, said limb being provided intermediate its ends with spaced parallel depending legs, said legs being provided with button-like extensions constituting trunnions, a longitudinally elongated bar-like member hingedly connected at one end to the junctural portion of the body and limb, the opposite end being formed into a jaw member opposed to the first-named jaw member, spring means between the body and intermediate part of the bar, cam provided with bearings rockably mounted on said trunnions, said cam being engageable with the intermediate part of the movable jaw member and being provided with an operating lever.

3. As a component part of an assemblage of the class described, a body having a socket to accommodate a lead-in, a limb extending angularly from said body, said limb terminating in a fixed jaw member, said limb being provided intermediate its ends with spaced parallel depending legs, said legs being provided with button-like extensions constituting trunnions, a longitudinally elongated bar-like member hingedly connected at one end to the junctural portion of the body and limb, the opposite end being formed into a jaw member opposed to the first-named jaw member, spring means between the body and intermediate part of the bar, a cam provided with bearings rockably mounted on said trunnions, said cam being engageable with the intermediate part of the movable jaw member and being provided with an operating lever, and a sectional enclosing shell for the body, limb, jaw members, bar member, springs, cams and other parts, said shell being composed of insulated sections separably bolted together and including a renewable tip within the vicinity of the jaw members.

4. As a new article of manufacture and as a component part of an assemblage of the class described, a unit comprising a substantially cylindrical body portion provided in one end with a socket to accommodate a lead-in, one end portion of said body merging into a limb and said limb extending at an approximate obtuse angle and terminating at its free end in a jaw, there being a seating notch at the junctural portion of the limb and the body portion, the intermediate portion of said limb being provided with spaced parallel depending legs, said legs being provided adjacent their free ends and on their opposed inner faces with button-like extensions constituting trunnions.

HARDICK F. FULLER.